United States Patent Office 3,317,297
Patented May 2, 1967

3,317,297
METHOD OF CHEMICALLY STRENGTHENING GLASS
Neil Hunter Ray, Northwich, England, assignor to Imperial Chemical Industries Limited, London, England, a corporation of Great Britain
No Drawing. Filed May 7, 1964, Ser. No. 365,776
Claims priority, application Great Britain, May 24, 1963, 20,893/63
6 Claims. (Cl. 65—30)

This invention relates to a process for strengthening and protecting glass.

The comparatively low strength of ordinary glass is due to the presence of numerous small cracks and other defects in the surface, which act as stress-concentrators and cause failure at lower values of tensile stress than the undamaged material will withstand. One way of increasing the strength of glass is to dissolve away a layer of about 0.001 inch in thickness from the surface by means of hydrofluoric acid, or by treatment with sodium silicate solution in an autoclave. This treatment removes or smooths out the cracks and leaves the surface in a relatively flawless condition, and the strength is increased by a factor of 10 to 15 times; however, the glass in this condition is easily damaged by handling, or by exposure to weather and abrasion, and the strength quickly returns to its original low value. Attempts to protect the surface by depositing films of other substances on to it have so far not been too successful either because the film is too easily removed or because contraction of a strongly adherent film produces a tension in the surface of the glass which weakens it.

The surface of glass can be put into a state of compressive stress, which enables it to resist damage by causing new cracks to close up and incipient cracks to heal themselves, either by heat-treatment, as for example in the manufacture of toughened glass, or by altering its composition chemically so as to lower its density. For example when a sodium-containing glass is immersed in a bath of molten potassium nitrate, potassium ions partially replace sodium ions in the glass surface, and because potassium ions occupy a greater volume in glass than sodium ions the surface layer is put into compression. The increase in strength that can be obtained in this way is not very great (from 2 to 3 times) but the effect is permanent. Unfortunately, it is not possible to apply a potassium ion-exchange treatment as a protection for glass that has been strengthened by etching in hydrofluoric acid or sodium silicate, because such glass is thermally unstable and its strength is much reduced by heating to the temperatures of 300° to 500° C. necessary for an ion-exchange treatment. Neither is it useful to etch the surface of glass that has been treated by ion-exchange because no improvement in strength is obtained until the modified surface layer is dissolved away. Hitherto, therefore, no way has been known of combining the strengthening action of an etching bath with the protective action of an ion-exchange treatment.

We have now found that certain substances behave as etching agents for glass at elevated temperatures needed for an ion-exchange process, and that these substances can be incorporated in a suitable molten salt bath, for example molten potassium nitrate, in which they are soluble, with the result that glass treated in such a mixture is both strengthened and protected against subsequent damage. We have also found another group of substances which, though they are not themselves capable of etching glass, markedly improve the process as a whole. It is possible that they assist or catalyse the action of the high-temperature etching agents in the first group and enhance their effect, but it is more certain that they increase the rate of cation-exchange.

According to one form of our invention we provide a process for strengthening and protecting glass comprising subjecting the glass to the action of at least one etching agent as hereinafter defined, dissolved in a molten salt, said salt being one whose cations at the temperature of the melt replace a proportion of the cations in the surface of the glass and thereafter occupy a larger volume in the glass than said cations in the surface.

We have also found that it is possible to carry out the strengthening and protecting process in two stages. In the first of these the glass is subjected to the action of the etching agent or agents, as hereinafter defined, dissolved in a molten salt that does not bring about cation-exchange in the surface of the glass. For example, one could use molten sodium nitrate with an ordinary sodium glass. In the second stage the etch glass is subjected to the action of a molten salt that does bring about cation-exchange in the surface of the glass, for example potassium nitrate with a soda glass.

Thus according to a second form of our invention we provide a two-stage process for strengthening and protecting glass comprising in the first stage subjecting the glass to the action of one or more etching agents, as hereinafter defined, dissolved in a molten salt whose cations in the surface of the glass, and in the second stage subjecting the etched glass to the action of a molten salt whose cations at the temperature of the melt replace a proportion of the cations in the surface of the glass and thereafter occupy a larger volume in the glass than said cations in the surface.

Suitable etching agents include sodium and potassium borofluorides, sodium and potassium fluorides, ammonium fluorosulphate, silver fluoride. Of these sodium and potassium borofluorides are particularly effective. These etching agents can be used along or in combination, and also in combination with other substances which act as catalysts or modifiers.

The temperature and time needed to produce the desired effect vary with the etching agent used but generally lie within the range 300°–500° C. and 5 minutes to 2 hours, preferably from 400° to 450° C. and for 10 to 30 minutes.

The catalysts or modifiers are not of themselves etching agents, but improve the process of the invention. They include silver and those of its salts that are soluble in molten potassium nitrate at temperatures between 350° and 450° C.; and monovalent gold salts that are similarly soluble. Silver salts, for example silver nitrate, are particularly effective as catalysts; so is metallic silver, from which it would seem that it is silver cations that are responsible for the catalytic effect.

One preferred combination of etching agent, molten salt and catalyst for the first or one-stage form of the invention, that is to say in which etching and cation-exchange takes place in the same molten salt mixture, is potassium borofluoride, potassium nitrate and silver nitrate. The temperature of the melt, the proportions of the constituents in it, and the time over which the glass undergoing strengthening is immersed in it are interrelated, and admit of individual variation, but particularly effective is a temperature range of 400°–450° C., an immersion time of 10–30 minutes, and a melt composition of 38 to 40% by weight of potassium borofluoride, 58 to 60% by weight of potassium nitrate and 2 to 4% by weight of silver nitrate. The useful range of melts can be described as comprising molten potassium nitrate containing 20 to 60% by weight of sodium or potassium borofluorides and 2 to 5% by weight of silver nitrate.

For the second or two-stage form of the invention, that is to say in which etching is performed in a first stage and cation-exchange in a second stage a convenient time for the etching is 10 to 15 minutes at 400° to 450° C. and for the cation-exchange 3 to 10 minutes at the same temperature or thereabouts. The proportion of etching agent in the molten salt of the first stage can be from 20% to 60% by weight with a preferred value of 35% to 40%, for example molten sodium nitrate containing 40% by weight of sodium or potassium borofluorides. In the second stage wherein the cation-exchange takes place a convenient proportion of the catalyst is from 2 to 4% by weight. It is sometimes advantageous to include a proportion of sodium or potassium borofluorides in the second-stage molten salt mixture, not for its etching power but for other reasons, for example to lower the melting point of the salt mixture.

The two-stage form of the invention is particularly useful when applied to sheet glass that has been made by a process that leaves its surface contaminated with a metal, for example tin, that can reduce silver salts to metallic silver. Such glass assumes after strengthening treatment by the one-stage form of the invention a yellowish-brown tint due to metallic silver, but by the two-stage form the etching action in the first stage removes the contaminated layer from the surface; consequently in the second stage no metal is present to reduce silver salts to metallic silver.

The invention is illustrated by the following examples, in which all percentages are by weight.

*Example 1*

Glass rods 10 cms. long and 4 mms. diameter made from a glass containing 71.5% $SiO_2$, 2.2% $Al_2O_3$, 3.0% MgO, 14.0% $Na_2O$, 5.7% CaO, 1.5% BaO and 1.5% $K_2O$ were immersed in batches of six at a time for 15 minutes at 400° C. in molten potassium nitrate containing different amounts of potassium borofluoride and silver nitrate. After treatment the rods were cooled, washed and dried and then three or more of the batch were abraded by rolling together for one minute inside a roughened cylinder revolving 100 times per minute. After this their ultimate strengths in flexure were determined by a standard 4-point bend test. The strengths of any unabraded rods in each batch were similarly determined. In some experiments all six rods in a batch were subjected to abrasion. The results of these determinations are given in Table I, and the flexural strengths shown for the melt having the composition $KBF_4$ 39% and $AgNO_3$ 2% are the averages obtained from 14 batches. The average ultimate flexural strength of untreated glass rods of the same composition and dimensions was 16,000 lbs./sq. inch.

TABLE I

| Treatment | | Average Ultimate Flexural Strength, lb./sq. inch | |
|---|---|---|---|
| Molten potassium nitrate at 400° C. containing— | | Before abrasion | After abrasion |
| $KBF_4$ | $AgNO_3$ | | |
| Percent | Percent | | |
| nil | nil | 30,000 | 31,000 |
| 10 | nil | 47,000 | |
| 20 | nil | 30,000 | 30,000 |
| 20 | 2 | 46,000 | 47,000 |
| 20 | 5 | 45,000 | 43,000 |
| 35 | 5 | | 40,000 |
| 39 | 2 | 80,000 | 56,000 |
| 50 | nil | | 66,000 |
| 50 | 0.2 | | 61,000 |
| 50 | 4 | | 76,000 |
| 65 | nil | | 61,000 |
| nil | 2 | 36,000 | 35,000 |
| nil | 4 | 27,000 | 28,000 |

*Example 2*

Glass rods of the same composition and dimensions as those described in Example 1 were treated in molten mixtures of potassium nitrate and potassium borofluoride at different temperatures and for different times. Some of the mixtures contained 2% silver nitrate. Flexural strengths were determined as described in Example 1 and all values given in Table II are the averages of not less than 8 results.

TABLE II

| Treatment conditions | | | | Flexural strength, lb./sq. inch | |
|---|---|---|---|---|---|
| Time, hours | Temp., °C. | $KBF_4$ | $AgNO_3$ | After treatment | After abrasion following treatment |
| | | Percent | Percent | | |
| 0.25 | 400 | 40 | nil | 36,000 | 29,000 |
| 1.0 | 400 | 40 | nil | 34,000 | 28,000 |
| 0.25 | 450 | 40 | nil | 64,000 | 68,000 |
| 1.0 | 450 | 40 | nil | 73,000 | 60,000 |
| 0.25 | 400 | 40 | 2 | 87,000 | 68,000 |
| 1.0 | 400 | 40 | 2 | 50,000 | 47,000 |
| 0.25 | 450 | 40 | 2 | 76,000 | 50,000 |
| 1.0 | 450 | 40 | 2 | 64,000 | 51,000 |
| 0.25 | 450 | 60 | 2 | 53,000 | 34,000 |
| 1.0 | 450 | 60 | 2 | 67,000 | 53,000 |
| 0.25 | 400 | 60 | 2 | 51,000 | 41,000 |
| 1.0 | 400 | 60 | 2 | 44,000 | 48,000 |
| 0.25 | 400 | 60 | nil | 32,000 | 19,000 |
| 1.0 | 400 | 60 | nil | 54,000 | 31,000 |
| 0.25 | 450 | 60 | nil | 73,000 | 44,000 |
| 1.0 | 450 | 60 | nil | 52,000 | 24,000 |

*Example 3*

Glass rods of the same composition and dimensions as those described in Example 1 were treated first for 15 minutes in a molten mixture of sodium nitrate and sodium borofluoride containing 60% and 40% respectively. They were removed from the melt and then treated in molten potassium nitrate containing 2% by weight of silver nitrate at 450° C. for 3 minutes. The average flexural strengths determined before and after abrasion as described in Example 1 were respectively 89,000 and 79,000 lb./sq. inch.

*Example 4*

Flat sheets of glass 6 inches square were treated first for 10 minutes in a molten mixture of sodium nitrate (60%) and sodium borofluoride (40%) at 450° C. They were removed from the melt and then treated for 10 minutes in a molten mixture of potassium nitrate (59%), potassium borofluoride (39%) and silver nitrate (2%) at 450° C. After cooling the sheets were supported at their edges and tested for impact strength by allowing a steel ball weighing 36 g. to fall freely from heights increasing by intervals of six inches until the glass fractured. The results are given in Table III.

TABLE III

| Type of glass | Condition | Average falling height required for 36 g. ball to cause fracture |
|---|---|---|
| Photographic plate 1/16 inch thick | Untreated | 30 inches. |
| Do | Treated | 72 inches. |
| Window glass 1/8 inch thick | Untreated | 12 inches. |
| Do | Treated | 72 inches. |

*Example 5*

Flat sheets of 1/4-inch plate (float) glass 6 inches square were treated in a molten mixture of potassium nitrate (59%), potassium borofluoride (39%) and silver nitrate (2%) at 450° C., some for 10 minutes, some for 20 minutes, and after cooling were tested for impact strength by means of a freely falling steel ball weighing 225 g. The results are given in Table IV.

TABLE IV

| Type of glass | Condition | Average falling height required for 225 g. ball to cause fracture |
|---|---|---|
| Plate (float) glass ¼ inch thick | Untreated | 2 feet. |
| Do | Treated 10 minutes. | 4 feet. |
| Do | Treated 20 minutes. | 5 feet. |

Example 6

One-pound glass jam jars were treated for 10 minutes in a molten mixture of potassium nitrate (59%), potassium borofluoride (39%) and silver nitrate (2%) at 450° C. After cooling the pressure required to burst them was determined by filling them with water and increasing the pressure therein until they burst. The results are given in Table V.

TABLE V

| Condition of jar: | Average bursting pressure, lb./sq. inch |
|---|---|
| Untreated | 118 |
| Only the inside treated | 250 |
| Only the outside treated | 300 |
| Inside and outside treated | 300 |

Example 7

Glass rods of the same composition and dimensions as those described in Example 1 were treated for 15 minutes in a molten mixture of potassum nitrate (59%), potassium borofluoride (39%), and thallium sulphate (2%) at 500° C. Flexural strengths determined as described in Example 1 averaged 87,000 lb./sq. inch before abrasion and 48,000 lb./sq. inch after abrasion.

What I claim is:

1. In a process for strengthening glass by etching it to remove surface-flaws and by replacing sodium ions in its surface-layers with potassium ions in order to produce a compressive force therein, the improvement comprising first contacting the glass with a melt-system containing at least one borofluoride selected from the group consisting of sodium bonofluoride and potassium borofluoride but no other potassium salt in order to etch the glass and thereafter with a melt-system containing potassium nitrate and a catalyst selected from the group consisting of silver and silver nitrate in order to replace sodium ions at the surface of the glass with potassium ions.

2. A process as claimed in claim 1 comprising contacting the glass for 10 to 15 minutes with a melt-system of sodium nitrate and sodium borofluoride containing 35% to 40% by weight of the latter and at a temperature of 400° C. to 450° C., and thereafter contacting it for 3 to 10 minutes with a melt-system containing by weight 96% to 98% of potassium nitrate, and 2% to 4% of silver nitrate and at a temperaure of 400° C. to 450° C.

3. In a process for strengthening glass by etching it to remove surface-flaws and by replacing sodium ions in its surface-layers with potassium ions in order to produce a compressive force therein, the improvement comprising contacting the glass with a molten mixture of potassium nitrate, at least one borofluoride selected from the group consisting of sodium borofluoride and potassium borofluoride, and a catalyst selected from the group consisting of silver and silver nitrate at a temperature of 300° C. to 500° C. for from 5 minutes to 2 hours.

4. A process as claimed in claim 3 comprising contacting the glass for 10 to 30 minutes with a melt-system at a temperature of 400° C. to 450° C. and containing by weight 58% to 60% of potassium nitrate, 38% to 40% of at least one borofluoride selected from sodium borofluoride and potassium borofluoride, and 2% to 4% of silver nitrate.

5. A process for strengthening sodium glass comprising contacting the glass at a temperature in the range 300° C.–500° C. with an etching melt-system and with an ion-replacing melt-system for a period of time sufficient to remove surface-flaws from the glass and replace sodium ions at the surface of the glass with potassium ions, said etching melt-system containing by weight 20% to 60% of an etching compound selected from the group consisting of sodium borofluoride, potassium borofluoride, ammonium fluorosulphonate and silver fluoride, said ion replacing melt-system containing potassium nitrate and by weight 2% to 5% of a catalyst selected from the group consisting of metallic silver and salts of silver.

6. A process as in claim 5 in which said melt-systems are combined into a single melt-system containing by weight 20%–60% etching compound, 2%–5% catalyst and the remainder potassium nitrate.

References Cited by the Examiner

UNITED STATES PATENTS 3,023,139  2/1962  Tetterode _____ 65—31
3,218,220  11/1965  Weber _____ 65—31

FOREIGN PATENTS

Jones, Latent Milling Marks on Glass, J. of Amer. Cer. Soc., Vol. 29, No. 4, April 1946, pp. 108–114.

Kestler, "Stresses in Glass Produced by Non-Uniform Exchange of Monovalent Ions," J. of Amer. Cer. Soc., Vol. 45, No. 2, February 1962, pp. 59–68.

DONALL H. SYLVESTER, *Primary Examiner.*

S. LEON BASHORE, *Examiner.*

G. R. MYERS, *Assistant Examiner.*